United States Patent
Vanderspurt et al.

(10) Patent No.: US 8,070,860 B2
(45) Date of Patent: Dec. 6, 2011

(54) PD MENBRANE HAVING IMPROVED $H_2$-PERMEANCE, AND METHOD OF MAKING

(75) Inventors: Thomas Henry Vanderspurt, Glastonbury, CT (US); Ying She, Worcester, MA (US); Zissis Dardas, Worcester, MA (US); Craig Walker, South Glastonbury, CT (US); James D. MacLeod, Vernon, CT (US)

(73) Assignee: United Technologies Corporation, East Hartford, CT (US)

( * ) Notice: Subject to any disclaimer, the term of this patent is extended or adjusted under 35 U.S.C. 154(b) by 345 days.

(21) Appl. No.: 12/311,294

(22) PCT Filed: Sep. 28, 2006

(86) PCT No.: PCT/US2006/037934
§ 371 (c)(1), (2), (4) Date: Mar. 25, 2009

(87) PCT Pub. No.: WO2008/041968
PCT Pub. Date: Apr. 10, 2008

(65) Prior Publication Data
US 2010/0005969 A1    Jan. 14, 2010

(51) Int. Cl.
*B01D 53/22* (2006.01)
*B01D 71/02* (2006.01)
*B01D 67/00* (2006.01)
*B05D 5/00* (2006.01)

(52) U.S. Cl. ............... 96/11; 96/4; 96/8; 96/10; 95/55; 95/56; 427/247; 427/436; 427/437; 427/443.1

(58) Field of Classification Search ............ 96/4, 8, 96/10, 11; 95/45, 55, 56; 55/524, DIG. 5; 427/247, 436, 437, 443.1
See application file for complete search history.

(56) References Cited

U.S. PATENT DOCUMENTS

| | | | |
|---|---|---|---|
| 5,738,708 A | 4/1998 | Peachy et al. | |
| 5,789,027 A | 8/1998 | Watkins et al. | |
| 5,989,319 A * | 11/1999 | Kawae et al. | 96/11 |
| 6,152,987 A * | 11/2000 | Ma et al. | 95/56 |
| 6,379,524 B1 | 4/2002 | Lee et al. | 205/255 |
| 6,828,037 B2 * | 12/2004 | Uemura et al. | 427/436 |
| 6,964,697 B2 | 11/2005 | Pan et al. | |
| 2004/0237779 A1 | 12/2004 | Ma et al. | 95/55 |
| 2004/0244590 A1 | 12/2004 | Ma et al. | 96/11 |

* cited by examiner

Primary Examiner — Jason M Greene
(74) Attorney, Agent, or Firm — Stephen A. Schneeberger

(57) ABSTRACT

An $H_2$-permeable membrane system (117) comprises an electroless-deposited plating (115) of Pd or Pd alloy on a porous support (110, 110'). The Pd plating comprises face-centered cubic crystals cumulatively having a morphology of hexagonal platelets. The permeability to $H_2$ of the membrane plating (115) on the porous support is significantly enhanced, being at least greater than about $1.3 \times 10^{-8}$ mol·m$^{-1}$·s$^-$·Pa$^{-0.5}$ at 350° C., and even greater than about $3.4 \times 10^{-8}$ mol·m$^{-1}$·s$^{-1}$·Pa$^{-0.5}$. The porous support (110, 110') may be stainless steel (1100 and include a thin ceramic interlayer (110') on which the Pd is plated. The method of providing the electroless-deposited plating includes preheating a Pd electroless plating solution to near a plating temperature substantially greater than room temperature, e.g. 60° C., prior to plating.

9 Claims, 4 Drawing Sheets

Pd [111] face

Pd [111] face showing
growing 2nd layer

PD MENBRANE HAVING IMPROVED H₂-PERMEANCE, AND METHOD OF MAKING

The U.S. Government has a paid-up license in this invention and the right in limited circumstances to require the patent owner to license others on reasonable terms, as provided for by the terms of Contract No. DE-FC36-02AL67628, formerly DE-FG04-2002AL67628, awarded by the Department of Energy.

TECHNICAL FIELD

This invention relates to selective gas separation, and more particularly to palladium membranes for the separation of hydrogen from a gas stream. More particularly still, the invention relates to improved palladium membranes, and the process by which they are made.

BACKGROUND ART

Gas separation and purification devices are used to selectively separate one or more target gasses from a mixture containing those and other gasses. One well known example is the use of certain membranes for the selective separation of hydrogen ($H_2$) from a stream, flow, or region containing hydrogen in a mixture with other gasses. While the membranes for the selective separation of $H_2$ might generally be polymers or metal, the polymer membranes are typically limited to use in low temperature environments. In circumstances where the membranes must be used in conjunction with high temperature processes, or processing, it becomes necessary to rely upon metal membranes.

In a typical example, the $H_2$ may be the product of a reformation and/or water gas shift reaction of a hydrocarbon fuel, and the $H_2$, following separation from other reformate or reaction gasses, may be used in a relatively pure form as a reducing fuel for the well-known electrochemical reaction in a fuel cell. The processes associated with the reformation and/or water gas shift reactions are at such elevated temperatures, as for example, reactor inlet temperatures of 700° C. and 400° C. respectively, that $H_2$ separation, at or near those temperatures, requires the use of metal membranes. The metal perhaps best suiting these needs is palladium, which is selectively permeable to $H_2$, relative to other gasses likely to be present, and has high durability at these operating temperatures.

Composite membranes of palladium (Pd) or its alloy, consisting of a thin palladium layer deposited on a porous metal (PM), oxidation resistant substrate, when integrated with the reformer or the water gas shift reactor, result in desirable $H_2$ permeation flux and offer significant advantages towards system size and cost reduction. Pd—Ag and Pd—Cu-based alloys are required for extended membrane stability in a sulfur-free or sulfur containing reformate, respectively, with the former being quite important for fuel cell power plants requiring a number of start up and shut down cycles. For a palladium alloy membrane to be produced by electroless plating (EP) or certain other techniques, high temperature thermal treatment, e.g., in the 550° C.-650° C. temperature regime, in a controlled atmosphere is needed in the latter stages of the process. Because this thermal treatment will, or may, cause intermetallic diffusion of the porous metal substrate constituents into the Pd phase that is detrimental to $H_2$ permeance, an intermetallic diffusion barrier, usually a ceramic, is typically placed on the surface of the porous metal substrate prior to the palladium plating. Examples of such techniques may be found in, for example, U.S. Pat. No. 6,152,987 and U.S. published applications US 2004/0237779 and 2004/0244590 by Y. H. Ma, et al. In the instances cited above, this ceramic interlayer is grown thermally, either as an oxide from the metal support or as a separate phase like nitride from $N_2$ or $NH_3$ decomposition or carbide from a carbon-containing gas stream. The palladium membrane support is thermally treated in air, ammonia, nitrogen or a carbon-containing gas at extreme temperatures and prolonged times to achieve this result. Additionally, following formation of the ceramic interlayer, the outer surface of that interlayer is activated by seeding it with the nuclei of the metal that is to form the membrane, i.e., Pd. This activation of that outer surface of the interlayer facilitates the subsequent electroless plating of the Pd onto that surface Following the formation and activation of a ceramic layer on the metal support, the support is plated with Pd by being immersed in a Pd electroless plating bath. That electroless plating bath has typically been prepared from several components, including Pd and hydrazine ($H_2NNH_2$, or $N_2H_4$), combined at room temperature, i.e., 20-25° C. The ceramic coating on the support has been subsequently plated by immersion in the electroless plating bath for an interval at a temperature of about 60° C.

Pursuant to the foregoing process, the resultant palladium or palladium alloy, membrane is typically less than 50 microns (µm) in thickness, and has typically been formed on the exterior surface of a tubular chamber or conduit in which the reformation or water gas shift reaction occurs and/or the reformate flows. All else being equal, because an increase in the flux of hydrogen through the membrane can be obtained by reducing its thickness, there is incentive to reduce the thickness as much as reasonably possible while keeping mechanical strength. On the other hand, there are practical limits to the structural integrity and durability, and indeed even gas-type selectivity if the membrane becomes too thin. While the Pd membranes of the prior art may be fairly economical in their use of Pd, their location on the exterior of a tube or the like, subjects them to possible scratching or abuse during handling, which may result in leakage. In one example constructed in accordance with the prior art, the membrane had a thickness of about 18 microns and an $H_2$ permeance of no more than about 12 m³/(m² hr atm$^{0.5}$) over an interval of more than 60 hours at 350° C.

The hydrogen flux through a membrane, J, can be described by Sievert's law, which is: $J=Q/L\ (P_1^{0.5}-P_2^{0.5})$. The $P_1$ and $P_2$ are the partial pressures of hydrogen on either side of the membrane and the difference in the square roots of these pressures is the driving force through the membrane. The quantity Q/L in front of the driving force term is the permeance. Q is the permeability and L is the thickness of the membrane. The permeability, Q, is essentially the diffusivity of hydrogen through the membrane, D, times the partition coefficient or solubility, H, between the hydrogen in the gas phase and the hydrogen on the surface of the membrane. Thus, the permeability is: $Q=D*H$ and the permeance is $D*H/L$.

To increase permeance, either the permeability has to be increased or the thickness reduced. Conversely, to increase physical durability and robustness, the thickness of a material with a given permeability is often increased, resulting in a decrease of the permeance of the resulting membrane.

Accordingly, there is a need to provide an improved Pd or Pd alloy membrane with a relatively high selective permeance to $H_2$ flux. There is a further need to provide an improved Pd or Pd alloy membrane with a relatively high selective permeance and retained or improved durability and robustness.

Still further, it is desirable to provide such an improved Pd alloy in a configuration that minimizes exposure to physical abuse.

DISCLOSURE OF INVENTION

The present invention relates to the synthesis of an $H_2$-permeable membrane system in which the Pd membrane possesses an $H_2$-permeability significantly greater than that of the prior art. The membrane is an electroless-deposited plating of Pd or Pd alloy on a porous support, the plating of Pd or Pd alloy comprising face-centered cubic crystals cumulatively having a surface morphology of hexagonal platelets. The $H_2$-permeability, or more accurately permeance, of a membrane about 22 micron thick and having this morphology increased from about 20 $m^3/(m^2\ hr\ atm^{0.5})$ to 50 $m^3/(m^2\ hr\ atm^{-5})$ over an interval of more than 250 hours at 350° C. This difference in the microstructure of the Pd layer is believed principally responsible for the significant increase in $H_2$ permeance.

The process of forming the Pd or Pd alloy electroless plating on the porous support, while similar to the prior art in many respects, differs in at least one aspect believed to be crucial to obtaining the face-centered cubic crystals cumulatively having a surface morphology of hexagonal platelets believed to be essential to the enhanced $H_2$ permeance. Specifically, whereas an electroless plating bath has heretofore been prepared from several components, including Pd and hydrazine ($H_2NNH_2$, or $N_2H_4$), combined at room temperature, i.e., 20-25° C., and then subjected to a temperature of about 60° C. during the plating process, the present invention prepares that same or a similar bath by first preheating the plating solution, to about 60° C., adding a relatively small amount of the hydrazine at nominally room temperature, and then completing the plating process at about 60° C.

It is believed that this process increases the rate of crystal growth over the rate of nucleation and to favor the [111] surface of Face-Centered Cubic Pd metal, thus resulting in the hexagonal, plate-like Pd domains; whereas the rate of nucleation with the prior art process is believed to be comparable to the rate of crystal growth and the [111] surface was not favored.

Further benefit is derived by placing the electroless-plated Pd or Pd alloy, membrane on the oxidation resistant, interior surface of a generally tubular porous metal support. By locating the membrane on the interior surface of the support, a smoother surface for a thin plating may be provided and the potential for damage during handling and storage is reduced.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
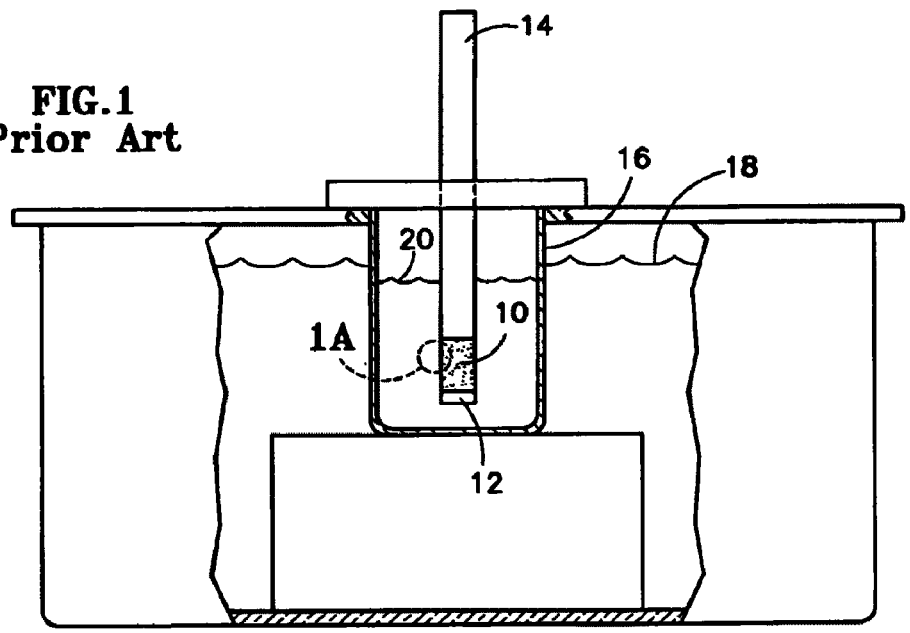
FIG. 1 is a simplified diagram of a setup for electroless Pd plating a membrane on a sample in accordance with the prior art.

Referring to FIG. 1, there is depicted a simplified diagram of a setup for the electroless Pd plating of a membrane on a sample in accordance with the Prior Art. Specifically, a 1" long tubular support 10 of porous stainless steel is provided with a cup-like geometry by the inclusion of a solid (hollow but non-porous) stainless steel cap 12 welded to cover one end. That porous stainless steel support 10 is welded to a 7" solid (non-porous) stainless steel tube 14. The support 10 was cleaned with a basic solution of deionized (DI) water in alternation with iso-propanol. That solution formed an ultrasonic bath at 60° C., and the cleaning occurred for about 1 hour in 5 minute intervals that alternated between the DI water and the iso-propanol. Then the sample support 10 was dried in an oven at 120° C. for 2 hours, and was further pretreated by oxidation in a furnace in an air atmosphere at 550° C. for 6 hours with heating and cooling rates of 2° C./min.

The oxidized sample support 10 was activated by immersing into $PdCl_2$ and $SnCl_2$ solutions, successively. The composition of the $PdCl_2$ and the $SnCl_2$ solutions was as shown in Table 1 below.

TABLE 1

| Activation solutions | |
|---|---|
| Component | |
| $PdCl_2$ | 0.1 g/l |
| HCl (37%) | 1.0 ml/l |
| $SnCl_2$ | 1.0 g/l |
| HCl (37%) | 1.0 ml/l |

The nonporous part 14 and 12 of the sample support 10 was wrapped with a sealing tape (e.g., of Teflon) to avoid being activated. The sample support 10 was immersed in a 100 ml beaker with about 70 ml of the $SnCl_2$ solution for about 5 minutes. Then, the sample support was dipped into a first 100 ml DI water beaker (not shown) and then immersed in a second 100 ml DI water beaker (not shown) for approximately 3 to 5 minutes. The inside of the sample support 10 was rinsed with DI water. The sample was placed in a 100 ml beaker (not shown) with about 70 ml of $PdCl_2$ solution for 5 minutes. The sample support was immersed in a 100 ml beaker (not shown) with 0.01 M HCl for about 1 minute. The sample support was dipped into a third 100 ml DI water beaker (not shown). The inside of the sample support was rinsed with DI water. The activation treatment was repeated for 7 times. The Teflon tape was removed and the sample support was washed with DI water for five times. Then, the sample support 10 was dried in the oven at 120° C. for two hours. The exterior surface of the sample support 10 was thus activated for the subsequent electroless plating.

The Pd electroless plating was conducted in a beaker 16 placed in water bath 18 having a temperature of about 60° C., as depicted in FIG. 1. The composition of the Pd plating solution 20 is listed in Table 2 below.

TABLE 2

Pd Electroless Plating Solution

| Component | Solution |
|---|---|
| $Pd(NH_3)_4Cl_2 2H_2O$ | 4.0 g/l |
| $Na_2EDTA 2H_2O$ | 40.0 g/l |
| $NH_4OH$ (28%) | 200 ml/l |
| *$N_2H_4$ (1M) | 5.6 ml/l |

*$N_2H_4$ is hydrazine and may also be expressed as $H_2NNH_2$

The nonporous part 14 and 12 of the activated sample support 10 was wrapped with a sealing tape (e.g., of Teflon) to assure the plating occurred only on the activated surface of the sample support 10. The activated sample support 10 was dipped into a DI water beaker (not shown) several times to wet the surface for uniform activation. The sample support 10 was then immersed into 70 ml of plating solution 20 existing at room temperature, e.g., about 20-25° C., in the 100 ml beaker 16. The plating beaker 16 was placed in the water bath 18 existing at 60° C., where it remained for about 90 minutes. The partially plated sample support was removed from the beaker 16 and rinsed with warm DI water, then the plating and rinsing process was repeated three times. Finally, the Teflon tape was removed and the sample support 10 was washed with DI water five times and dried in an oven at 120° C. for two hours. The sample was plated for a total of about 15 hours and the Pd thickness was estimated to be 18 μm based on the weight gain after plating.

Figure 1A:
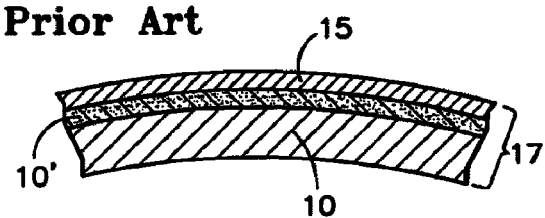
FIG. 1A is an enlarged, diagrammatic, cross-sectional view of the encircled portion of FIG. 1, showing the prior art sample support and the Pd membrane thereon.

Referring briefly to FIG. 1A, a diagrammatic, cross-sectional view is provided of a portion of the sample support 10 of FIG. 1. That Figure diagrammatically depicts the porous stainless steel support 10, the activated oxide layer 10', and the Pd membrane layer 15 plated thereon, which cumulatively form an $H_2$-permeable membrane system 17. The Pd membrane layer 15 is about 18 μm thick.

Figure 2:
FIG. 2 is a photomicrograph of the morphology of a Pd membrane in accordance with the prior art.

Referring to FIG. 2, there is depicted a photomicrograph of the morphology of the Pd-plated exterior surface of the porous sample support 10 of FIG. 1 prepared in accordance with the prior art. Notable in this photomicrograph is the general agglomeration of irregularly-shaped Pd crystallites.

Figure 3:
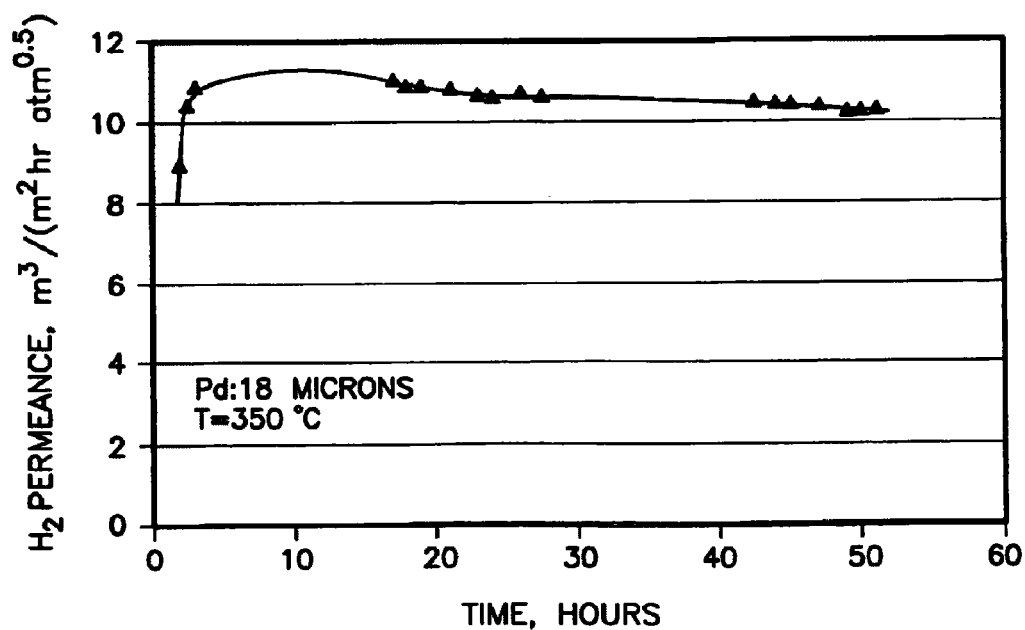
FIG. 3 is a plot of the $H_2$ permeance of a Pd membrane in accordance with the prior art.

Referring to FIG. 3, there is displayed a plot of the $H_2$-permeance of the Pd-membrane 15 on sample support 10 of FIG. 1 prepared in accordance with the prior art. More specifically, it will be noted that the permeance of the 18 micron Pd membrane to $H_2$ at an operating temperature of 350° C. was initially about 8 $m^3/(m^2 \text{ hr atm}^{0.5})$, and increased only to a maximum of about 12 $m^3/(m^2 \text{ hr atm}^{0.5})$ at 5 hours, where it remained and then began a decline over the next 60+ hours.

In contrast with the prior art described above in connection with FIGS. 1-3, the process of the present invention to be described with reference to FIGS. 4-7 differs in a relatively limited yet unobvious manner, and results in a Pd membrane of different morphology and notably improved permeance to $H_2$.

Figure 4:
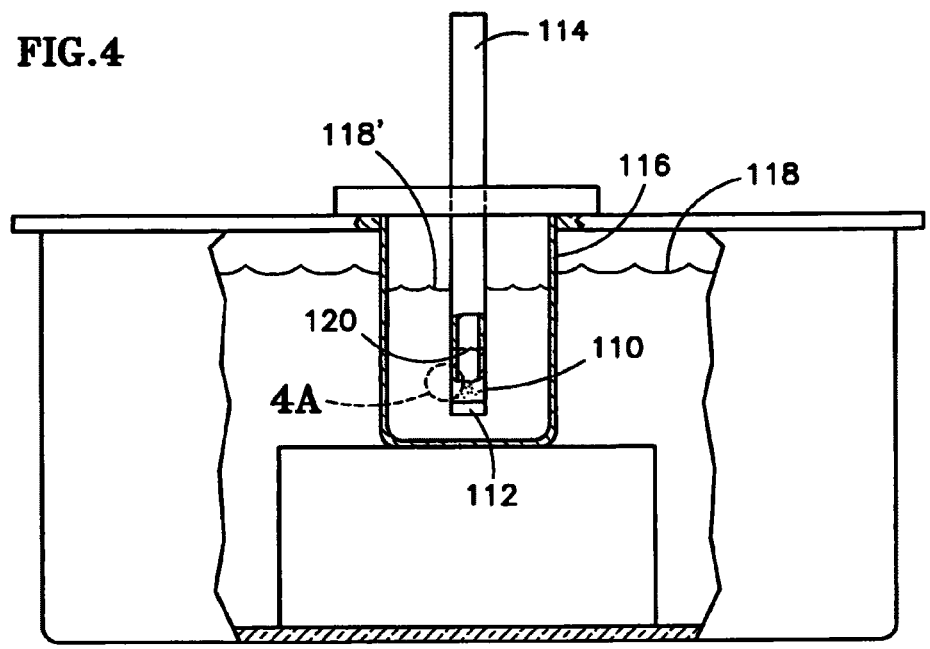
FIG. 4 is a simplified diagram similar to FIG. 1 of a setup for electroless Pd plating a membrane on a sample in accordance with the present invention.

Referring to FIG. 4, there is depicted a simplified diagram of a setup for the electroless Pd plating of a membrane on a sample in accordance with the invention. Specifically, a 1" long tubular support 110 of porous stainless steel is provided with a cup-like geometry by the inclusion of a solid (non-porous) stainless steel cap 112 welded to cover one end. That porous stainless steel support 110 is welded to a 7" solid (hollow but non-porous) stainless steel tube 114. The support 110 was cleaned with a basic solution of deionized (DI) water in alternation with iso-propanol. That solution formed an ultrasonic bath at 60° C., and the cleaning occurred for about 1 hour in 5 minute intervals that alternated between the DI water and the iso-propanol. Then the sample support 110 was dried in an oven at 120° C. for 2 hours, and was further pretreated by oxidation in a furnace in an air atmosphere at 550° C. for 6 hours with heating and cooling rates of 2° C./min.

Because in the instance of this sample it is on the interior surface of the porous stainless steel support 110 that the membrane is to be plated, the oxidized sample support 110 was activated by adding the $PdCl_2$ and $SnCl_2$ solutions, successively in alternation to the interior of the porous stainless steel support 110. The composition of the $PdCl_2$ and the $SnCl_2$ solutions was as shown in Table 3 below (and is the same as Table 1 for the Prior Art).

TABLE 3

Activation solutions

| Component | |
|---|---|
| $PdCl_2$ | 0.1 g/l |
| HCl (37%) | 1.0 ml/l |
| $SnCl_2$ | 1.0 g/l |
| HCl (37%) | 1.0 ml/l |

The exterior surface of that porous stainless steel support 110 was wrapped with a sealing tape (e.g., Teflon) to avoid solution leak. An amount of $PdCl_2$ solution just sufficient to fill the porous stainless steel support 110 (about 3.5 ml) was added to the interior via the stainless steel tube 114, remained there for 5 minutes, and then was poured out and rinsed with deionized water. Subsequently, 3.5 ml of $SnCl_2$ solution was added to the interior of the porous stainless steel support 110, remained there for 5 minutes, and then was poured out and rinsed with deionized water. Finally, 3.5 ml of 0.01 M HCl solution was added to the interior of the porous stainless steel support 110, remained there for 3 minutes, and then was poured out and rinsed with deionized water. The preceding activation sequence was repeated 7 additional times. The Teflon tape was removed and the sample support was washed with DI water for five times. Then, the sample support 110 was dried in the oven at 120° C. for two hours. The interior surface of the sample support 110 was thus activated for the subsequent electroless plating.

The Pd electroless plating was ultimately conducted within the sample support 110 in a beaker 116 of water 118' in turn placed in water bath 118, both having a temperature of about 60° C., as depicted in FIG. 4. The composition of the Pd plating solution 120 is listed in Table 4 below (and is the same as Table 2 for the Prior Art).

TABLE 4

Pd Electroless Plating Solution

| Component | Solution |
| --- | --- |
| $Pd(NH_3)_4Cl_2 2H_2O$ | 4.0 g/l |
| $Na_2EDTA 2H_2O$ | 40.0 g/l |
| $NH_4OH$ (28%) | 200 ml/l |
| *$N_2H_4$ (1M) | 5.6 ml/l |

*$N_2H_4$ is hydrazine and may also be expressed as $H_2NNH_2$

The exterior surface of that porous stainless steel support 110 was wrapped with a sealing tape (e.g., Teflon) to avoid solution leak. Importantly to the invention, the plating solution was preheated to 60° C., except for the hydrazine solution ($N_2H_4$) that was added just prior to the plating. 5 ml of the plating solution preheated at 60° C. was mixed with 0.03 ml 1 M hydrazine solution at room temperature, and the combined plating solution 120 nominally at 60° C. was then poured into the interior of the sample support 110. The plating step lasted for about 20 minutes and then the plating solution 120 was poured out. The sample support 110 was then promptly rinsed with warm DI water at about 60° C. several times and the plating step restarted/repeated by adding the 5 ml preheated plating solution mixed with 0.03 ml 1 M hydrazine. The plating process was repeated several times during a day and then the sample was washed with DI water for 5 times and dried in an oven at 120° C. for two hours. The interior of this stainless steel support sample 110 was plated for a total of about 94 hours and the Pd thickness was estimated to be 22 μm based on the weight gain before and after plating. It will be noted that far less plating solution was required because it was contained in the interior of the sample support 110, as contrasted with the prior example's need to provide adequate plating solution in the beaker 16 to plate the exterior of sample support 10. This also resulted in briefer plating steps of 20 minutes duration. On the other hand, whereas each of the plating steps of the prior art was longer in duration (90 minutes vs 20 minutes), the process of the invention used relatively less plating solution and duration per plating step and required a greater number of repetitions such that the total process was longer (90 hrs. vs 15 hrs.).

Figure 4A:
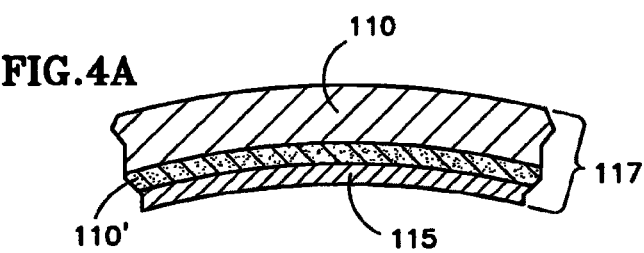
FIG. 4A is an enlarged, diagrammatic, cross-sectional view of the encircled portion of FIG. 4, showing the sample support and the Pd membrane thereon in accordance with the invention.

Referring briefly to FIG. 4A, a diagrammatic, cross-sectional view is provided of a portion of the sample support 110 of FIG. 4. That Figure diagrammatically depicts the porous stainless steel support 110, the activated oxide layer 110', and the Pd membrane layer 115 plated thereon, which cumulatively form an $H_2$-permeable membrane system 117. The Pd membrane layer 115 is about 22 μm thick.

Figure 5:
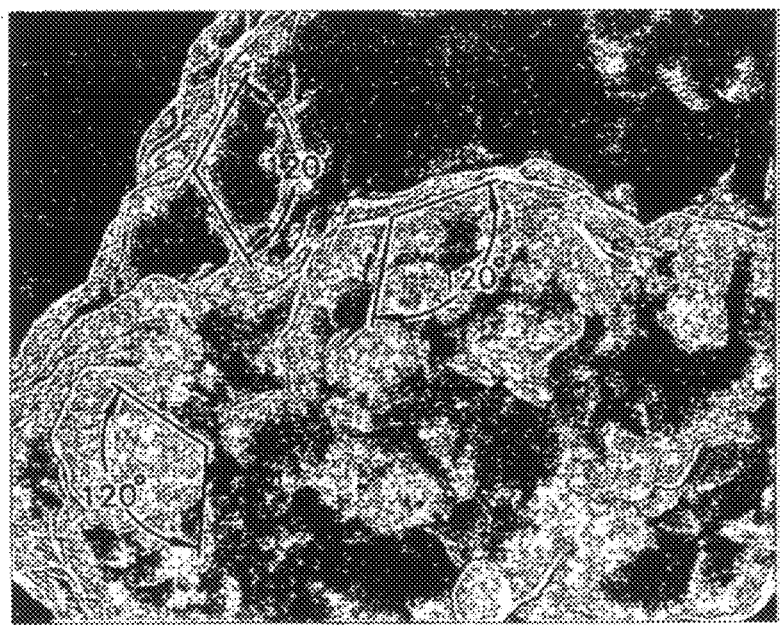
FIG. 5 is a photomicrograph of the morphology of a Pd membrane in accordance with the present invention, generally depicting the hexagonal Pd platelets.

Referring to FIG. 5, there is depicted a photomicrograph of the morphology of the Pd-plated exterior surface of the porous sample support 110 of FIG. 4 prepared in accordance with invention. Notable in this photomicrograph is the distinctly hexagonal platelet morphology of the Pd, which has been emphasized in the Figure by the superimposed indicators of 120° angles. While the process describe above differs from the prior art both in that it plates the interior surface of the sample rather than the exterior and that it preheats the plating solution prior to the actual plating process, it is this latter difference that is believed principally responsible for the difference in morphology and permeance. The preheating of the electroless plating solution to about 60° C. before it came into contact with the activated porous substrate surface is believed to increase the rate of crystal growth over the rate of nucleation and to favor the [111] surface of Face Centered Cubic Pd metal, thus giving the hexagonal plate-like Pd domains.

Figure 6A:
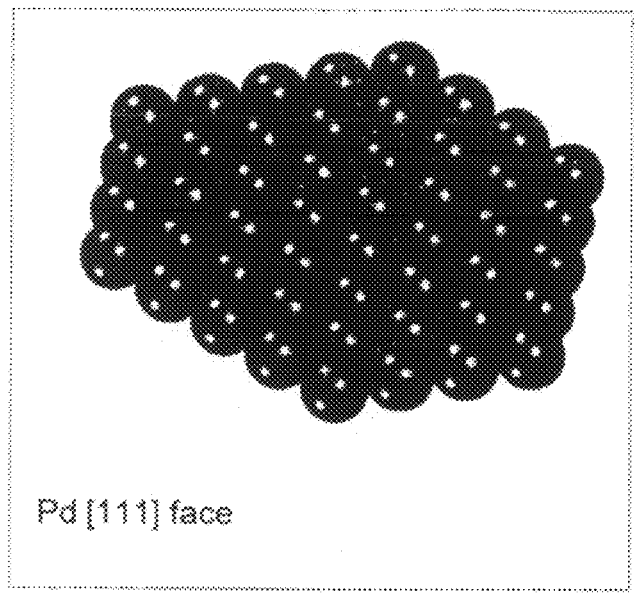
FIG. 6A is an atomic model of the [111] face of the Pd face-centered cubic metal.
Figure 6B:
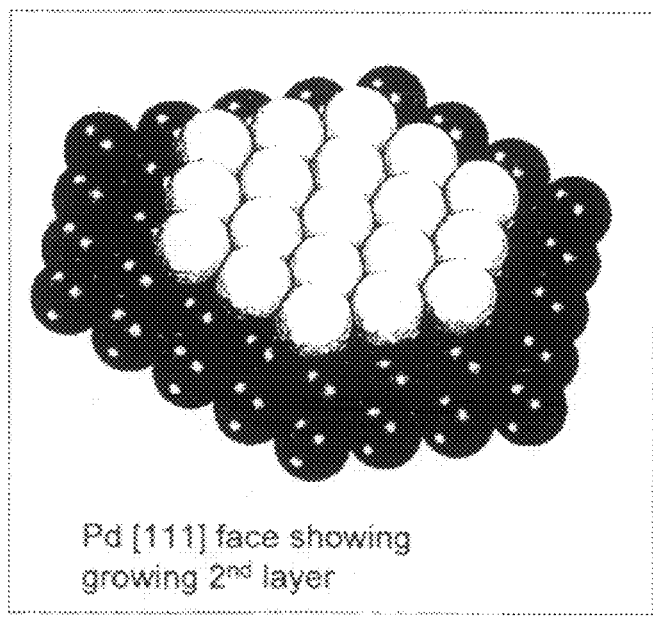
FIG. 6B is a further atomic model of the [111] face of the Pd face-centered cubic metal of FIG. 6A, further showing the growth of a hexagonal platelet layer thereon.

Reference to FIGS. 6A and 6B provides an atomic model depiction of the growth of the hexagonal platelet layers of Pd on the Pd [111] face when that face is energetically favored. FIG. 6A depicts the Pd [111] hexagonal face of that Face Centered Cubic-metal. FIG. 6B depicts the Pd [111] face of FIG. 6A, showing the growth of a hexagonal second layer.

Figure 7:
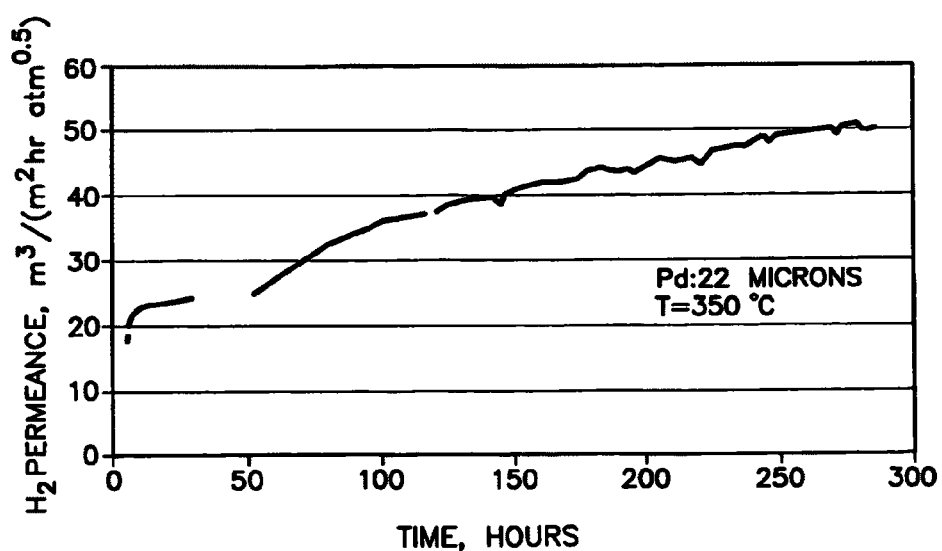
FIG. 7 is a plot of the $H_2$ permeance of a Pd membrane in accordance with the present invention.

Referring to FIG. 7, there is displayed a plot of the $H_2$-permeance of the Pd-membrane 115 on sample support 110 of FIG. 4 prepared in accordance with the invention. More specifically, it will be noted that the permeance of the 22 micron Pd membrane to $H_2$ at an operating temperature of 350° C. was always greater than about 15 $m^3/(m^2\ hr\ atm^{0.5})$, initially being about 20 $m^3/(m^2\ hr\ atm^{0.5})$ and continually increasing over the next 250-300 hours to about 50 $m^3/(m^2\ hr\ atm^{0.5})$ where it generally remained. This represents a permeance to $H_2$ that is significantly greater than for prior art Pd membranes on porous stainless steel substrates, both initially and particularly also after lengthy operation. This is so, despite the membrane being relatively thicker, and thus more durable, than the Prior Art example (22 micron vs 18 micron), indicating a relative improvement in the permeability of the Pd material of the membrane.

The permeance refers to the hydrogen flux per unit area of a given membrane whatever its thickness, with a given pressure differential. The permeability converts this to the hydrogen flux, per unit thickness and per unit area of the gas permea-selective phase like Pd, with a given differential pressure. Thus, for the hexagonal morphology Pd membrane with the observed permeance of about 50 $m^3/(m^2\ hr\ atm^{0.5})$ and which was 22 microns thick, this is equivalent to a permeability of $4.25 \times 10^{-8}\ mol \cdot m^{-1} \cdot s^{-1} \cdot Pa^{-0.5}$.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. An $H_2$-permeable membrane system (117), comprising: an electroless-deposited plating (115) of Pd or Pd alloy on a porous support (110, 110'), the electroless deposited plating of Pd or Pd alloy comprising face-centered cubic crystals cumulatively having a surface morphology of hexagonal platelets.

2. The $H_2$-permeable membrane system (117) of claim 1 wherein the permeability to $H_2$ of the Pd or Pd alloy plating (115) on the porous support (110, 110') at an operating temperature of about 350° C. is greater than about $1.3 \times 10^{-8}$ $mol \cdot m^{-1} \cdot s^{-1} \cdot Pa^{-0.5}$, which is equivalent to a $H_2$ permeance greater than about 15 $m^3/(m^2 \cdot hr \cdot atm^{0.5})$ for a 22-μm thick membrane.

3. The $H_2$-permeable membrane system (117) of claim 2 wherein the permeability to $H_2$ of the Pd or Pd alloy plating (115) on the porous support (110, 110') after about 60 hours at said operating temperature is greater than about $1.7 \times 10^{-8}$ $mol \cdot m^{-1} \cdot s^{-1} \cdot Pa^{-0.5}$, which is equivalent to a $H_2$ permeance greater than about 20 $m^3/(m^2 \cdot hr \cdot atm^{0.5})$ for a 22-μm thick membrane.

4. The $H_2$-permeable membrane system (117) of claim 3 wherein the permeability to $H_2$ of the Pd or Pd alloy plating (115) on the porous support (110, 110') after about 200 hours at said operating temperature is greater than about $3.4 \times 10^{-8}$ $mol \cdot m^{-1} \cdot s^{-1} \cdot Pa^{-0.5}$, which is equivalent to a $H_2$ permeance greater than about 40 $m^3/(m^2 \cdot hr \cdot atm^{0.5})$ for a 22-μm thick membrane.

5. The $H_2$-permeable membrane system (117) of claim 2 wherein the porous support (110, 110') is a tubular structure (110) having an internal surface, a thin ceramic interlayer (110') is formed on the internal surface of the porous support, and the Pd or Pd alloy plating (115) is formed on the ceramic interlayer.

6. The $H_2$-permeable membrane system (117) of claim 5 wherein the porous support (110) is stainless steel.

7. The $H_2$-permeable membrane system (110) of claim 1 wherein the porous support (114) is a tubular structure having an internal surface, a thin ceramic interlayer is formed on the internal surface of the porous support, and the Pd or Pd alloy plating is formed on the ceramic interlayer.

8. The method of forming an $H_2$-permeable membrane (115) on a support surface of a porous metal substrate (110, 110') comprising the steps of:
   a. preparing and preheating a Pd electroless plating solution to near a plating temperature substantially greater than a room temperature;
   b. contacting the supporting surface of the porous metal substrate with the preheated Pd electroless plating solution for an interval at a plating temperature substantially greater than room temperature to provide an incremental electroless plated deposition of Pd;
   c. following the interval, rinsing the porous metal substrate having the incremental electroless plated deposition,
   d. repeating plating and rinsing steps b and c two or more times to complete the plating;
   e. following completion of said plating, washing the plated porous metal substrate several times; and
   f. drying the plated porous metal substrate;
   wherein the Pd electroless plating solution comprises at least Pd and $H_2NNH_2$ in solution, the $H_2NNH_2$ being a relatively small portion of the total plating solution, and the step of preparing and preheating a Pd electroless plating solution to near a plating temperature substantially greater than a room temperature comprises the steps of preparing the Pd electroless plating solution without the $H_2NNH_2$, preheating said Pd electroless plating solution without the $H_2NNH_2$ to near a plating temperature substantially greater than room temperature, and then adding the relatively small portion of $H_2NNH_2$ nominally at room temperature, whereby the resulting Pd electroless plating solution remains heated substantially to near the plating temperature substantially greater than room temperature.

9. The method of forming an $H_2$-permeable membrane (115) on a support surface of a porous metal substrate (110, 110') comprising the steps of:
   a. preparing and preheating a Pd electroless plating solution to near a plating temperature substantially greater than a room temperature, the Pd electroless plating solution comprising at least Pd and $H_2NNH_2$ in solution, the $H_2NNH_2$ being a relatively small portion of the total plating solution, and comprising the included steps of preparing the Pd electroless plating solution without the $H_2NNH_2$, preheating said Pd electroless plating solution without the $H_2NNH_2$ to near a plating temperature substantially greater than room temperature, and then adding the relatively small portion of $H_2NNH_2$ nominally at room temperature, whereby the resulting Pd electroless plating solution remains heated substantially to near the plating temperature substantially greater than room temperature;
   b. contacting the supporting surface of the porous metal substrate with the preheated Pd electroless plating solution for an interval at a plating temperature substantially greater than room temperature to provide an incremental electroless plated deposition of Pd;
   c. following the interval, cleaning the porous metal substrate having the incremental electroless plated deposition;
   d. repeating plating and cleaning steps b and c as, and if, needed to complete the plating to a desired thickness; and
   e. drying the plated porous metal substrate.

* * * * *